(12) United States Patent
Nowrouzezahrai et al.

(10) Patent No.: US 9,396,580 B1
(45) Date of Patent: Jul. 19, 2016

(54) PROGRAMMABLE SYSTEM FOR ARTISTIC VOLUMETRIC LIGHTING

(75) Inventors: Derek Nowrouzezahrai, Zürich (CH); Wojciech Jarosz, Zürich (CH); Jared Johnson, Zürich (CH); Jesse Dylan Lacewell, Fremont, CA (US); Andy Selle, Montrose, CA (US); Michael Kaschalk, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1082 days.

(21) Appl. No.: 13/280,258

(22) Filed: Oct. 24, 2011

Related U.S. Application Data

(60) Provisional application No. 61/495,627, filed on Jun. 10, 2011.

(51) Int. Cl.
| | |
|---|---|
| *G06T 15/50* | (2011.01) |
| *G06T 15/60* | (2006.01) |
| G06T 15/80 | (2011.01) |
| G06T 15/06 | (2011.01) |

(52) U.S. Cl.
CPC ............ *G06T 15/506* (2013.01); *G06T 15/50* (2013.01); *G06T 15/06* (2013.01); *G06T 15/60* (2013.01); *G06T 15/80* (2013.01)

(58) Field of Classification Search
CPC ....... G06T 15/506; G06T 15/50; G06T 15/80; G06T 15/60; G06T 15/06
USPC .......... 345/419, 426, 424, 6, 30, 619, 156, 32
See application file for complete search history.

(56) References Cited

U.S. PATENT DOCUMENTS

| | | | | |
|---|---|---|---|---|
| 5,914,807 | A  * | 6/1999 | Downing ..................... | 359/326 |
| 7,423,645 | B2 * | 9/2008 | Dougherty et al. .......... | 345/426 |
| 8,009,168 | B2 * | 8/2011 | Zhou et al. ................... | 345/426 |
| 8,207,968 | B1 * | 6/2012 | Krishnaswamy et al. .... | 345/426 |
| 2005/0243089 | A1 * | 11/2005 | Johnston ...................... | 345/426 |
| 2009/0102843 | A1 * | 4/2009 | Sloan et al. .................. | 345/426 |
| 2012/0038645 | A1 * | 2/2012 | Norrby ........................ | 345/426 |
| 2013/0335406 | A1 * | 12/2013 | Tabellion ..................... | 345/419 |
| 2014/0267249 | A1 * | 9/2014 | Cooper et al. ................ | 345/420 |

OTHER PUBLICATIONS

Wojciech Jarosz (NPL—A Comprehensive Theory of Volumetric Radiance Estimation using Photon Points and Beams, 2011).*

(Continued)

*Primary Examiner* — Abderrahim Merouan
(74) *Attorney, Agent, or Firm* — Kilpatrick Townsend & Stockton LLP

(57) ABSTRACT

A method for creating artistic effects for volumetric illumination in a scene is provided. Data representing a scene is received. User input is received, which specifies a target appearance of the scene, including illumination effects that are at least in part non-physically-based. Photon beams representing volumetric illumination in the scene are generated; this step may incorporate user input-based modifications of the photon beams. Shading associated with the photon beams is computed; this step may also incorporate user input-based modifications. Any modifications in the generating or computing steps are derived from the specified target appearance of the scene. Finally, the photon beams are rendered.

25 Claims, 12 Drawing Sheets

(56) References Cited

OTHER PUBLICATIONS

William B. Kerr (NPL—BendyLights: Artistic Control of Direct Illumination by Curving Light Rays, 2010.*
Iman Sadeghi (NPL—An Artist Friendly Hair Shading System, 2010.*
Wojciech Jarosz, The Beam Radiance Estimate for Volumetric Photon Mapping 2008, Blackwell Publishing, vol. 27(2008), pp. 6, and 7.*
Chandrasekar, S., *Radiative Transfer.* (1960) Dover Publications, New York, New York.
Jarosz, W., Nowrouzezahrai, D., Sadeghi, I., and Jensen, H. W. 2011. A comprehensive theory of volumetric radiance estimation using photon points and beams. ACM Transactions on Graphics 30, 1 (Jan.), 5:1-5:19.
Jensen, H. W., and Christensen, P. H. 1998. Efficient simulation of light transport in scenes with participating media using photon maps. In Proceedings of SIGGRAPH 98, Computer Graphics Proceedings, Annual Conference Series, 311-320.
Kajiya, J. T. 1986. The rendering equation. In Computer Graphics (Proceedings of SIGGRAPH 86), 143-150.
Walter, B., Zhao, S., Holzschuch, N., and Bala, K. 2009. Single scattering in refractive media with triangle mesh boundaries. ACM Transactions on Graphics 28, 3 (Jul.), 92:1-92:8.
Williams, L. 1978. Casting curved shadows on curved surfaces. In Computer Graphics (Proceedings of SIGGRAPH 78), 270-274.
Nowrouzezahrai, D et al., "A Programmable System for Artistic Volumetric Lighting", '11 SIGGRAPH, ACM (Aug. 2011), ACM New York, NY, USA, 8 pages.
Nowrouzezahrai, D et al., "A Programmable System for Artistic Volumetric Lighting: Supplemental Document ", '11 SIGGRAPH, ACM (Aug. 2011), ACM New York, NY, USA, 3 pages.
U.S. Appl. No. 13/235,299, filed Sep. 16, 2011.
U.S. Appl. No. 13/280,212, filed Oct. 24, 2011.
Angelidis, A., Neyret, F., Singh, K., and Nowrouzezahrai, D., "A controllable, fast and stable basis for vortex based smoke simulation", In SCA, Eurographics Association, (2006), 25-32.
Christensen, P. H., "Point-based approximate color bleeding", Pixar Technical Memo, Jul. 1, 2008.
Cook, R. L., Carpenter, L., and Catmull, E., "The reyes image rendering architecture", In Computer Graphics (Proceedings of SIGGRAPH 87), (1987), pp. 95-102.
Fedkiw, R., Stam, J., and Jensen, H. W., "Visual simulation of smoke", In Proceedings of ACM SIGGRAPH 2001, Computer Graphics Proceedings, Annual Conference Series, (2001), pp. 15-22.
Hong, J.-M., Shinar, T., and Fedkiw, R. 2007. Wrinkled flames and cellular patterns. ACM Transactions on Graphics 26, 3 (Jul.), 47:1-47:6.
Kerr, W. B., and Pellacini, F. 2009. Toward evaluating lighting design interface paradigms for novice users. ACM Transactions on Graphics 28, 3 (Jul.), 26:1-26:9.
Kerr, W. B., and Pellacini, F. 2010. Toward evaluating material design interface paradigms for novice users. ACM Transactions on Graphics 29, 4 (Jul.), 35:1-35:10.
Kerr, W. B., Pellacini, F., and Denning, J. D. 2010. Bendylights: Artistic control of direct illumination by curving light rays. Computer Graphics Forum 29, 4, 1451-1459.
Křivánek, J., Fajardo, M., Christensen, P. H., Tabellion, E., Bunnell, M., Larsson, D., and Kaplanyan, A. 2010. Global illumination across industries. In SIGGRAPH Courses, ACM.
McNamara, A., Treuille, A., Popovic, Z., and Stam, J. 2004. Fluid control using the adjoint method. ACM Transactions on Graphics 23, 3 (Aug.), 449-456.
Obert, J., Kriva nek, J., Pellacini, F., SYkora, D., and Pattanaik, S. N. 2008. iCheat: A representation for artistic control of indirect cinematic lighting. Computer Graphics Forum 27, 4, 1217-1223.
Obert, J., Pellacini, F., and Pattanaik, S. N. 2010. Visibility editing for all-frequency shadow design Comput. Graph. Forum 29, 4, 1441-1449.
Pellacini, F., Battaglia, F., Morley, R. K., and Finkelstein, A. 2007. Lighting with paint. ACM Transactions on Graphics 26, 2 (Jun.), 9:1-9:14.
Pellacini, F. 2010. envylight: An interface for editing natural illumination. ACM Transactions on Graphics 29, 4 (Jul.), 34:1-34:8.
Sadeghi, I., Pritchett, H., Jensen, H. W., and Tamstorf, R. 2010. An artist friendly hair shading system. ACM Transactions on Graphics 29, 4 (Jul.), 56:1-56:10.
Schmid, J., Sumner, R. W., Bowles, H., and Gross, M. 2010. Programmable motion effects. ACM Transactions on Graphics 29, 4 (Jul.), 57:1-57:9.
Selle, A., Mohr, A., and Chenney, S. 2004. Cartoon rendering of smoke animations. In Non-photorealistic Animation and Rendering, ACM, 57-60.
Song, Y., Tong, X., Pellacini, F., and Peers, P. 2009. Subedit: A representation for editing measured heterogeneous subsurface scattering. ACM Transactions on Graphics 28, 3 (Jul.), 31:1-31:10.
Tabellion, E., and Lamorlette, A. 2004. An approximate global illumination system for computer generated films. ACM Transactions on Graphics 23, 3 (Aug.), 469-476.
Tessendorf, J., and Kowalski, M. 2010. Resolution independent volumes. In ACM SIGGRAPH 2010 Courses, SIGGRAPH.
Treuille, A., McNamara, A., Popovic, Z., and Stam, J. 2003. Keyframe control of smoke simulations. ACM Transactions on Graphics 22, 3 (Jul.), 716-723.

* cited by examiner

PROGRAMMABLE SYSTEM FOR ARTISTIC VOLUMETRIC LIGHTING

CROSS-REFERENCE TO RELATED APPLICATIONS

The present application claims priority to and incorporates by reference for all purposes Provisional Application No. 61/495,627, filed on Jun. 10, 2011 by Nowrouzezahrai et al. The present application also incorporates by reference for all purposes the following related and co-owned applications:

1) U.S. patent application Ser. No. 13/235,299, filed on Sep. 16, 2011 naming Jarosz, et al. (hereinafter "Jarosz") and entitled "Image Processing Using Iterative Generation of Intermediate Images Using Photon Beams of Varying Parameters"; and 2) U.S. patent application Ser. No. 13/280,212, filed on Oct. 24, 2011 naming Chen, et. al. (hereinafter "Chen") and entitled "Rendering Images with Volumetric Shadows using Rectified Height Maps for Independence in Processing Camera Rays".

BACKGROUND

Light scattering in participating media is responsible for many natural phenomena. Simulating the evolution of volumetric media over time, as well as the complex light transport within it, are difficult problems in animation. Recent advances have made it feasible to incorporate a wider range of such effects in feature animation production; however, most of this work has focused on accelerating computation and increasing accuracy. Given physically accurate techniques, manipulating physical parameters to attain a target look is a challenging process. Previous work addresses this problem by investigating art-directable control of light transport for surface reflectance. However, artistic authoring and manipulation of volumetric lighting remains a largely unsolved problem.

While physically accurate and art-directable rendering have seemingly conflicting goals, recent efforts to incorporate physically-based rendering into production have shown great potential. Such techniques are seeing increased adoption because they provide complex and subtle lighting which would otherwise take extensive manual manipulation to replicate with ad-hoc techniques. Unfortunately, physically-accurate rendering is often not sufficiently expressive for the caricatured nature of animated films: though physically-based rendering may provide a great starting point, the challenge then becomes introducing controls necessary to obtain a desired artistic vision.

SUMMARY

In some embodiments, a method for creating artistic effects for volumetric illumination in a scene is provided. Data representing a scene is received. User input is received, which specifies a target appearance of the scene, including illumination effects that are at least in part non-physically-based. Photon beams representing volumetric illumination in the scene are generated; this step may incorporate user input-based modifications of the photon beams. Shading associated with the photon beams is computed; this step may also incorporate user input-based modifications. Any modifications in the generating or computing steps are derived from the specified target appearance of the scene. Finally, the photon beams are rendered.

These general and specific aspects may be implemented using a component, a system, a method, or a computer program, or any combination of components, systems, methods, and computer programs.

Figure 5:
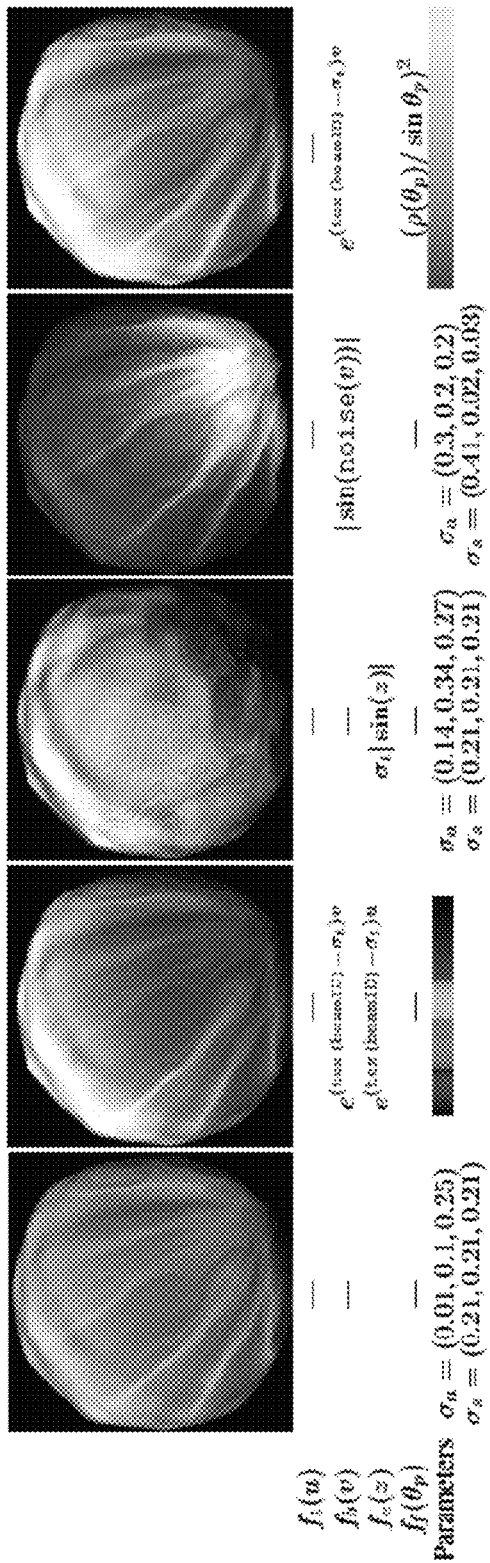
FIG. 5 explores non-physical shading of the same scene using simple procedural modifications of the four physical processes.

Appendix A presents example beam shader code (source code) for producing the left-most image in FIG. 5. Other variations of code and methods should be apparent from reading Appendix A.

DETAILED DESCRIPTION

Figure 1A:
FIG. 1 illustrates example curving light beams (FIGS. 1(a), 1(b) and 1(c)) in a rendered scene.
Figure 1:
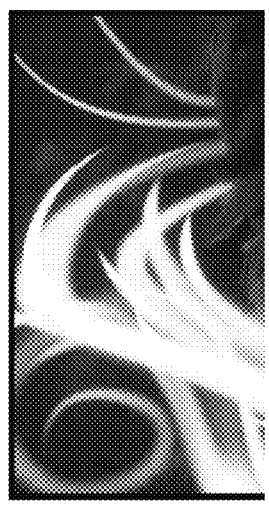
Figure 1:
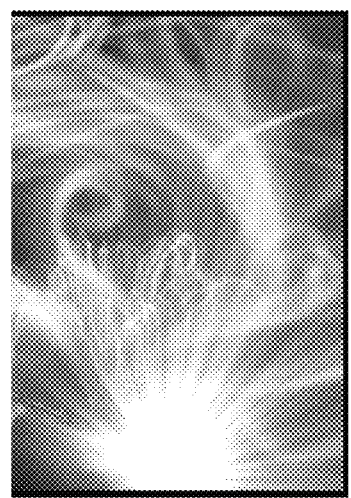

Computer systems involving hardware and software for taking in programmatic and art-directed inputs and translating those to renderable elements are described herein. With programmatic and art-directed injection of source terms into physically-based volumetric light transport, great flexibility is provided. A system is provided for generating target stylizations of volume effects, mimicking the way professional artists hand draw these effects. The approach is based on photon beams, which provide physically-based rendering of participating media. FIG. 1 illustrates use of the system to author artistic volumetric effects in a rendered scene. The ability to produce curving light beams was used to match the organic artistic style of the film.

The methods and processes described herein can be implemented in a hardware/software system as might be used by an artist or others to create animation, comprising input devices for specifying parameters and drawing images. For example, a user might use an input device to dial in a setting and then draw an image element with an input device. A system might include a processor and software to render and output images as well as display devices.

Generalizing photon beams to allow for artistic control of volumetric effects might involve:

1) Manipulating physical parameters of participating media results in unintuitive changes to the final image. To address this, physically-based scattering properties can be derived to match a user-specified target appearance, thereby providing an intuitive space for appearance modeling of participating media.

2) To allow for non-physical effects, both the photon generation and radiance estimation stages of the photon beams method are generalized. Each stage is replaced with a procedural, programmable component. While each component could implement the physically-based approach, this provides enough programmatic flexibility for artist-driven volumetric effects.

Several works provide intuitive user controls for editing the lighting or materials in a scene to obtain a desired surface shading effect. Among these approaches, either the geometry and intensity of light sources, or the surface material properties, are manipulated in order to control shadows and reflectance from local lights and environment lights. Photon beams are generalized to both volumetric material and lighting control.

Some embodiments target the control of more general volumetric effects, and thus use a different mathematical model (photon beams). Some embodiments also incorporate non-linear lighting.

Some embodiments focus on replicating hand-drawing workflows for volumetric effects using virtual tools. Some embodiments are based on traditional hand-drawn effects, as well as supporting both physically-based and art-directable effects.

Non-photorealistic rendering targets stylized rendering of images which are also addressed with our approach. Some embodiments focus on a particular type of stylization: plausible but exaggerated realism, as opposed to cartoon-like results.

There has been a push to use increasingly accurate rendering approaches in production; however, the challenge is providing procedural control to obtain a desired look. Manipulation of physically-based fluid animations has demonstrated the utility of this hybridization. At a high-level, these methods manipulate the simulation by injecting controlled source terms to the Navier-Stokes equation, instead of setting the initial fluid conditions. Analogously in light transport, light sources represent the initial conditions, but some embodiments add source terms locally to steer the transport of light. Using non-physical bi-directional reflectance distribution functions can also be seen as an injection of source terms. Our method applies these concepts to participating media by using photon beams as an intuitive and controllable volumetric lighting primitive.

Some embodiments build on top of existing content generation tools, which offer expressive customizability to author geometry and shading effects. Domain-specific programming languages (DSL) are an essential component for providing this flexibility. The classic example of this is the RenderMan™ Shading Language. Similarly, the FELT scripting language enables the controllable specification of fluid simulation behavior. Both of these systems have a long history of successful application in film production. Other tools such as Maya™ software and Houdini™ software also expose programmability through node-based visual DSLs, which provide artist-accessible models of programming. Our generalization of photons beams provides the flexibility of a DSL for the specific domain of volumetric lighting.

In an example of direct manipulation of appearance of volumetric lighting, a user might be given access to the input and/or output of a simulator and provide inputs as to how the lighting should change, such as two color values for two points on a photon beam, then back calculate the physical volumetric scattering parameters needed to result in that user specified lighting, then generate a lighting result using a conventional simulator or physics engine. In some cases, a lighting preprocessor will attempt to back calculate the physical volumetric scattering parameters and, if it succeeds, pass the results to the simulator or physics engine and, if it cannot back calculate valid parameters, inform the user. The system can then give the user an option to proceed with a non-physically based lighting process and render accordingly.

Volumetric Lighting Design Requirements

Some lighting systems are designed based on expressed artist needs. For example, requirements of an intuitive and expressive volumetric lighting system might be gathered directly from feature-film lighting artists and distilled into the following core principles (in decreasing order of importance in a particular embodiment):

1) the model should preferably adhere as closely as possible to abstractions that artists normally use when thinking about volume effects,
2) should preferably generate results spanning the entire gamut of believability, from physically accurate to completely art-directed,
3) the system ideally integrates as seamlessly as possible into the existing production pipeline, and
4) the system ideally exposes flexibility through programmability.

Preferably, the manner in which artists conceptualize volumetric effects strongly influences the way they reason about digitally replicating these effects. Since no existing tool directly addresses the problem of designing volumetric effects, artists have had to warp their intuitive models to fit the capabilities of existing tools. Typically, the biggest problem with volumes for artists is that, unlike surfaces, they are not intuitive. In particular, the lack of a geometric model makes them more difficult to grasp. Some embodiments provide this missing link for volumetric lighting, using photon beams. This hybrid light/geometry representation allows artists to think about light in a volume as its own geometric entity, to be manipulated and sculpted. Lighting volumetric effects then reduces to familiar modeling and shading problems. The beam representation also relates to the way artists draw volumetric effects.

Figure 2:
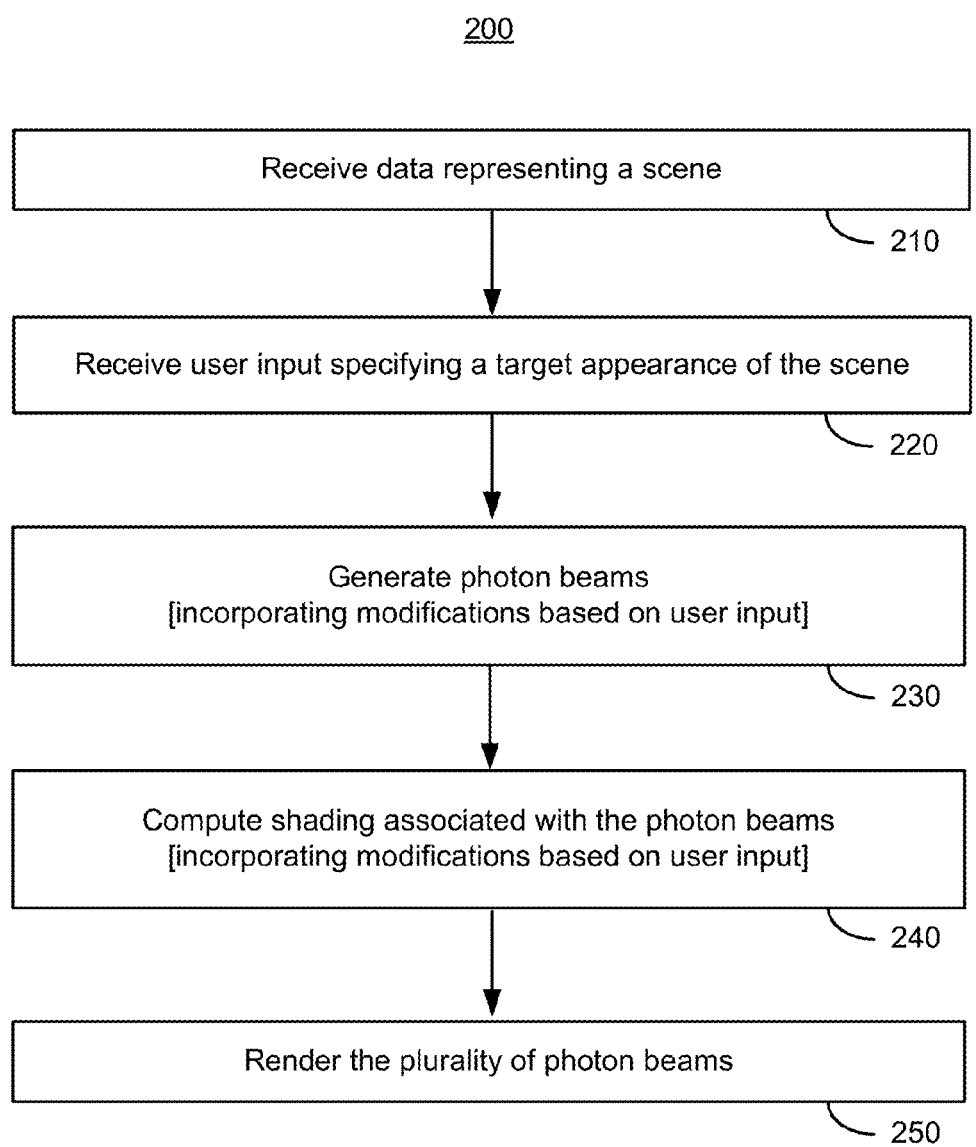
FIG. 2 illustrates a flowchart of a disclosed embodiment.

FIG. 2 illustrates a flowchart of some disclosed embodiments. In step 210, data representing a scene is received. Such data may include specifications of light sources and participating media. In step 220, user input specifying a target appearance of the scene is received. The target appearance may be specified in any conventional manner, including both computer-based and hand-drawn input.

In step 230, photon beams representing volumetric illumination in the scene are generated; in some embodiments, this step may incorporate modifications to one or more of the photon beams. The modifications are based on the target appearance of the scene, which may include specification of attributes associated with generation of photon beams, such as powers, shapes, physical dimensions, and directions. In some embodiments, an attribute associated with generation of photon beams may vary over time, e.g., kernel width of a photon beam may diminish or increase over time.

As one example, the artist might provide a desired target color at two or more specified locations along a beam and the lighting system will extrapolate and/or interpolate to find colors at other positions on the beam. The target colors need not be physically based (e.g., the beams can change color along their length without any need to explain the physical cause of the changing color). In another example, the beam might curve, as in FIG. 1.

As used herein, "non-physically based" refers to light beams that do not conform to physical norms. In a physically-realizable space without phosphorescence or other photo-reactive materials, a beam of light from a source does not grow brighter in any component. For example, a beam of light from a lamp does not add more red light as it travels through a volume and a pure yellow light beam does not turn to a pure red light beam in a physical environment. Also, light tends to travel in straight lines or follow refraction rules or diffraction rules when travelling through a medium. Examples of non-physically based light beams include a light beam that emanates from a source as red light, goes some distance, turns white, goes some more distance, and then turns blue before ending on the surface of an object. Another example, is a beam that leaves a source and meanders along a curved path, with the curved path not dictated by refractory objects or other such objects in a scene.

In using lighting systems described herein, an artist or other scene creator can specify a path and/or a starting color and ending color (or more than two such colors at more than two places along a beam) without a constraint that would otherwise be dictated by laws of optics and physics. Note that violations of physical laws is not required—the artist or creator can specify details for a light beam that are entirely consistent with what physics would allow. In some cases, rather than using a physics-based lighting system, the artist or creator might use a lighting system described herein even if the desired result is physically based. For example, the artist/creator might use the system to specify a light intensity at one point in the beam and another light intensity further away from the light source that is a lower intensity and the same hue. The lighting system could automatically color the beam so that those two constraints are met and the laws of optics/physics also appear to be complied with.

In some instances, a "user specification" of a target appearance of a scene is entered into the lighting system manually by the artist/creator, using a user interface to specify attributes of parts of a photon beam. In other instances, the user specification is programmatically derived. An example of the former is that the user is provided a user interface that allows the user to select a point in a 3D virtual space, locate a light source at that point, select another one or more points, specify the light color/intensity or other attribute at those points and so on. An example of the latter is an automated step that generates the user specification from higher level commands, such as a step of matching the lighting in one frame of video to other nearby in time frames of video. Such an approach might remove some of the tedium of getting the lighting just right in an animation sequence.

In step 240, shading associated with the photon beams is computed; in some embodiments, this step may incorporate modifications to the computation, wherein the modifications are based on user input. The modifications are based on the target appearance of the scene, which may include includes modifications to functions used when shading the photon beams. Such functions may include color change due to attenuation along a photon beam, color change due to attenuation towards the eye, shading based on a viewing angle; and shading based on width of a photon beam. In one embodiment, the specified target appearance of the scene includes specification of indirect illumination of participating media in the scene attributable to the photon beams. In one embodiment, modifications are derived from a specified attribute associated with a photon beam by extrapolating values between a specified target initial value for the attribute at a first location along the photon beam and a specified target final value for the attribute at a second location along the photon beam. In some embodiments, an attribute associated with shading, e.g., color attenuation, may vary over time. In some embodiments, attributes associated with shading of the photon beams are arbitrarily modified to result in non-physically-based shading of the photon beams, e.g., curving light beams.

In step 250, the photon beams are rendered.

Figure 3:
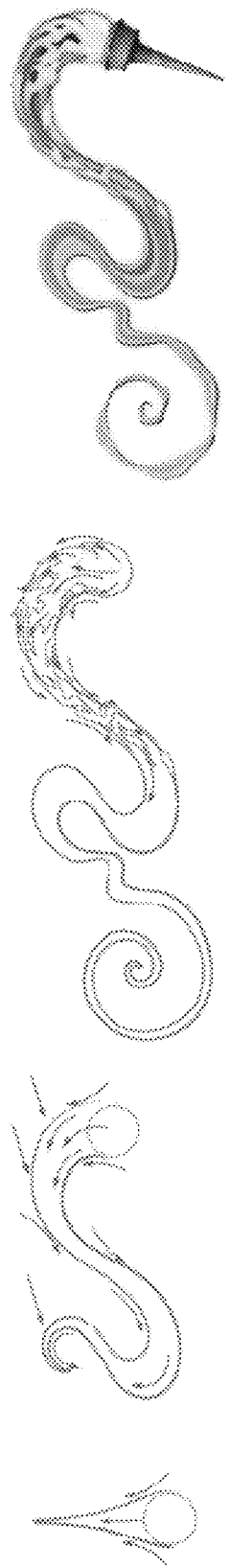
FIG. 3 illustrates a sample workflow of a hand-drawn artist.

FIG. 3 illustrates a sample workflow of an artist first sketching a coarse high-level outline of the media, then progressively refining this sketch to include dynamics and increased levels of detail, before finally "rendering" the final image. Artists often employ a two-stage procedure: first, shapes which coarsely define the media's volume are sketched and refined; then, given these shapes, shading is applied to obtain the final result. Some embodiments similarly separate the representation of the media from its shading: beam primitives define the "shape" and material properties of the media, to which a shading model is applied. Our solution generalizes the photon beams algorithm, where both the process of generating and shading beams can be performed using physically-accurate or non-physical, art-directable procedures.

Theoretical Foundation

Some embodiments define light transport in participating media, and briefly describe the photon beams algorithm. This approach is generalized below to facilitate artistic control. Some embodiments express light at a point, x (e.g., the camera) from direction co, as shown by Equation 1.

$$L(x,w)=L_s(x,w)+L_m(x,w) \quad \text{(Eqn. 1)}$$

Surface radiance (potentially attenuated by the media), $L_s$, is governed by the rendering equation. The second term in the right-hand side of Equation 1 is the radiance due to participating media and that is shown in more detail in Equation 2.

$$L_m(x,w)=\sigma_s\int_o^d e^{-\sigma_t z}\int_{\Omega_{4\pi}}\rho(\theta_z)L(x_z,w_z)dw_z dz \quad \text{(Eqn. 2)}$$

Equation 2 represents the radiance wherein light is accumulated at points $x_z$ along an eye ray (until the ray hits a surface d units away). This light recursively depends on radiance arriving at $x_z$ from directions $\omega_z$ over the sphere $\Omega_{4\pi}$. The phase function is $\rho$, where $\cos\theta_z = \omega \cdot \omega_z$. For simplicity, some embodiments may describe the case for homogeneous media with absorption, scattering and extinction coefficients, $\sigma_s$, $\sigma_a$, and $\sigma_t = \sigma_s + \sigma_a$. For brevity, some embodiments are described with reference to the set of (potentially spatially-varying) scattering coefficients as $\sigma = \{\sigma_s, \sigma_a, \sigma_t\}$.

Previous work has focused primarily on controlling or editing the $L_s$ term in Equation 1. Some embodiments focus on controlling the $L_m$ term in Equation 2.

Photon mapping methods compute Equation 1 in two-steps. During pre-computation, a collection of photons, each with power $\Phi_p$ and direction $\omega_p$, are traced through the scene and stored at points $x_p$ corresponding to intersections with surfaces and within volumetric media. These photons can be interpreted as a point-sampled representation of the light distribution, and locally approximate the radiance L(x, $\omega$). Second, during rendering, a shading pass queries the data and applies a physically accurate shading model to compute final radiance towards the eye.

In the photon beams method, the first pass remains, however each photon is treated as a beam of light starting at $x_p$ and going in direction $\omega_p$, and density estimation uses these photon beams, instead of photon points. Equation 3 presents a "BeamxBeam 1D" estimate for computing $L_m$ along camera rays given a collection of photon beams.

$$L_m(x, w) = \sigma_s \sum_p k_r(u)e^{-\sigma_t z}\rho(\theta_p)e^{-\sigma_t v}\frac{\Phi_p}{\sin\theta_p} \quad \text{(Eqn. 3)}$$

Figure 4:
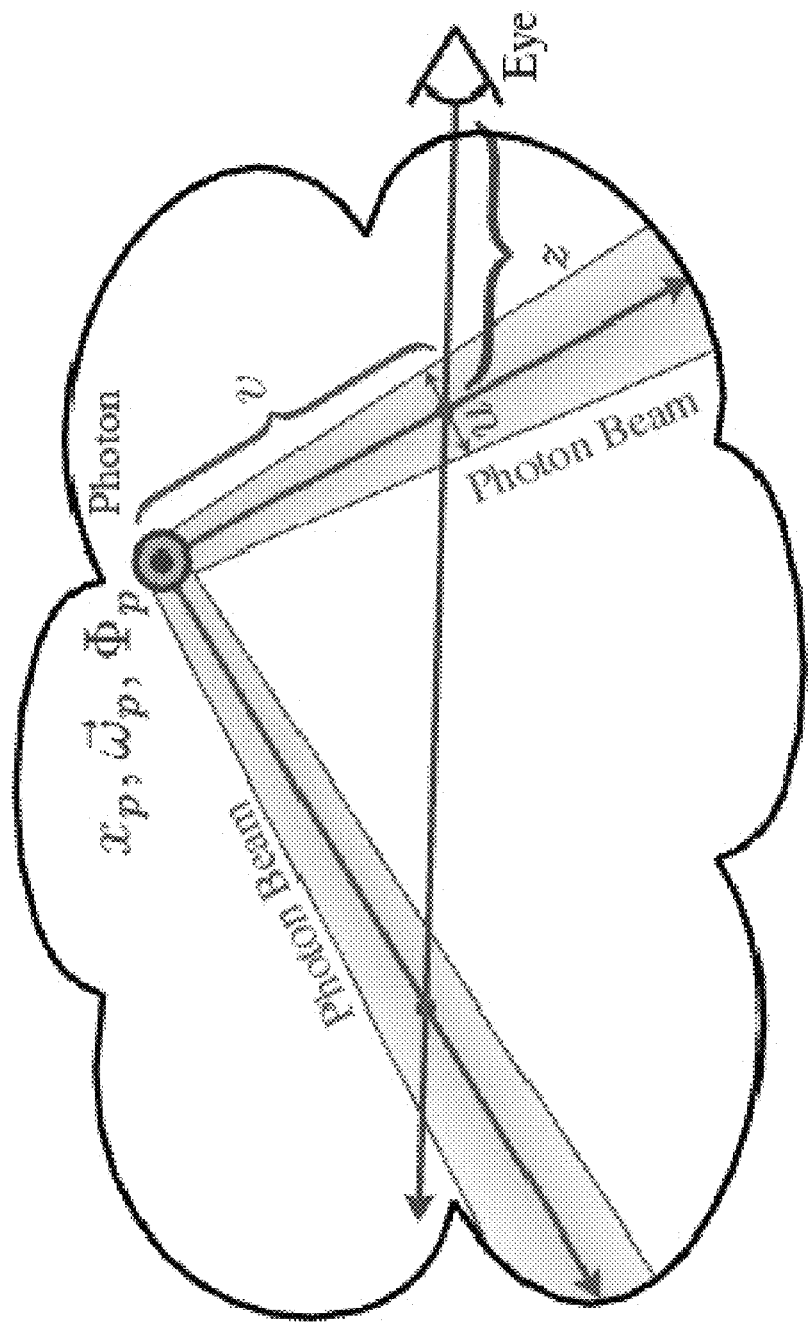
FIG. 4 illustrates one embodiments of a geometry for the Beam×Beam 1D of Equation 3.

The summation loops over all photon beams and evaluates the terms at the intersection of the camera ray with each photon beam (see FIG. 4). The $e^{-\sigma_t z}$ term represents transmittance towards the camera, where z is the distance between the intersection and the camera position x, and $e^{-\sigma_t v}$ term represents transmittance along the beam where v is the distance to $x_p$. The $\sin\theta_p$ term takes foreshortening into account for a flat beam as it rotates relative to ω. Each beam has a finite width determined by a kernel $k_r$, which weights photons according to the 1D distance u between the camera ray and the beam. Surface shading is naturally handled using photon mapping: the endpoints of the photon beams are surface photons and are used for density estimation of $L_s$. FIG. 4 illustrates the geometric setup for the physically accurate shading model in Equation 3.

Photon beams have an intuitive physical interpretation: a beam can be thought of as a small spotlight, attenuated volumetrically along its central axis. This geometric interpretation is tangible and easy to grasp. Furthermore, the approach provides a natural interpretation of geometry and shading in volumes. Together, these properties satisfy the first requirement presented in the above-listed core principles, making photon beams an ideal approach for us to extend. Unfortunately, photon beams do not satisfy all requirements set forth in the above-listed core principles: unmodified, the approach is limited to a very indirect form of editing not suitable for art-directability.

When physically accurate results are desired, it is difficult to construct a targeted shading result by directly manipulating σ in Equation 3. For example, a common volumetric design goal is to induce a desired color gradient across the media's volume; to do so with physically-based shading, the artist must manipulate the σ parameters. Unfortunately, these parameters only have an indirect, and often unintuitive, influence on the observed color of the medium. Instead of modifying the σ parameters, some embodiments provide a system that allows an artist to directly specify a desired color gradient. Described below are techniques to automatically deduce the physically-based scattering properties of the medium from this input. This provides a more intuitive parameter space for controlling the appearance of participating media, while maintaining physical correctness.

A more pressing limitation is that, often, a desired shading result requires non-physical shading. Equation 3 cannot satisfy this requirement, by definition. Equation 3 is abstracted herein into a few high-level effects, resulting in a generalized shading model suitable for both physical and non-physical shading.

In addition to shading, the generation and resulting distribution of photon beams influences the media lighting. While the physically-based approach is suitable in some scenarios, it is often difficult to create a desired effect by directly manipulating the physically-accurate light transport process. For this, ideas from steerable fluid simulation are incorporated into some embodiments. Some embodiments incorporate steerable source terms by allowing artists to procedurally sculpt and generate (potentially time-dependent) distribution of photon beams.

Deducing Scattering Parameters

For surface reflectance, specifying material properties is fairly intuitive and predictable. The user can, for instance, graphically choose the surface color or specular sharpness. Such surface parameters have fairly predictable behavior and artists can therefore rapidly produce a desired appearance. Unfortunately, specifying physically-based media parameters is a more difficult problem. The σ parameters in Equation 3 do not influence the final shading in such a direct, intuitive manner. For example, when directly manipulating $\sigma_s$ and $\sigma_t$, the media close to a white light source will have a color equal to $\sigma_s$, however, this color will diffuse to the complement of $\sigma_t$ with distance. Another complication is that the media parameters combined with the light source intensity are an over-complete parameter set. This means that an infinite number of parameter choices can lead to identical results. To overcome this, some embodiments present a tool that allows an artist to specify the observed color at two points along a beam in the medium, and returns the physical parameters for Equation 3 which induce this desired color gradient.

Some embodiments allow the user to specify two target colors, $C_1$ and $C_2$, within the medium (one at the start of a beam and one at a canonical distance (assumed to be 1) (arbitrary distances for $C_2$ simply result in uniform scaling of a) along the beam). Considering a beam perpendicular to the view at some canonical distance z, Equation 3 dictates the behavior along the length of the beam represented in Equation 4.

$$L_m(v)=\sigma_s \Phi_p e^{-\sigma_t v} \quad \text{(Eqn. 4)}$$

Some embodiments can omit the phase function ρ, since it is constant in this configuration. If the color and power $\Phi_p$ of the beam is fixed (corresponding to a fixed light source color in single-scattering), the parameters $\sigma_s$, $\sigma_t$, may be obtained under the constraints imposed by $C_1$ and $C_2$ as in Equations 5A and 5B.

$$C_1=\sigma_s \Phi_p e^{-\sigma_t z} \quad \text{(Eqn. 5A)}$$

$$C_2=\sigma_s \Phi_p e^{-\sigma_t z} e^{-\sigma_t} \quad \text{(Eqn. 5B)}$$

This provides two equations and with two unknowns, the parameters can be solved for directly. Dividing Equation 5B by Equation 5A provides an estimate for $\sigma_t$, (as in Equation 6A) and then plugging that back into the equations yields Equation 6B.

$$\sigma_t=-\log(C_2/C_1) \quad \text{(Eqn. 6A)}$$

$$\sigma_s=(C_1/\Phi_p)(C_1/C_2)^z \quad \text{(Eqn. 6B)}$$

Note that this solution is physically meaningful only if $\sigma_s \leq \sigma_t$, which can be satisfied if $C_2 < C_1$ in all color channels.

Some embodiments also provide the ability to specify all the parameters for photon beams using this gradient specification. In this case, not only are $\sigma_s$ and $\sigma_a$ deduced, but also the photon powers, using one interface. Unfortunately, the space is now over-complete, so to solve for $\sigma_t$ as before, there needs to be a way to disambiguate between the infinitely many solutions for $\Phi_p$ and $\sigma_s$. Given the albedo $\alpha=\sigma_s/\sigma_t$ (which the user typically does not modify from its default value), $\sigma_s=\alpha\sigma_t$ is solved and plugged back into Equations 6A/6B to obtain Equations 7A/7B.

$$\sigma_s=-\alpha\log(C_2/C_1) \quad \text{(Eqn. 7A)}$$

$$\Phi_s=(C_1/\sigma_s)(C_1/C_2)^z \quad \text{(Eqn. 7B)}$$

In addition to allowing more intuitive manipulation of scattering parameters, the derivations above also provide some interesting insights about the behavior of light in participating media. Considering the color gradient only along a single beam is similar to restricting our derivations to single-scattering (single-scattering is a beam emanating directly from a light with the beam's power set to that of the light). This implies that one could apply a similar procedure to obtain media parameters for an arbitrary single-scattering technique. Furthermore, it is apparent from our derivations that either albedo or the light's power are irrelevant to the final image color: by changing one, one can modify the other to obtain identical results.

Procedural Shading of Photon Beams

While the above mapping provides an intuitive parameter space for specifying physically-based participating media, our system ideally also supports non-physical shading, as discussed above. Equation 3 is distilled into a few simple concepts that may then be used to devise a non-physical generalization.

Given a collection of photon beams, the radiance on the image is influenced by only a few high-level parameters (see FIG. 4): the angle between the eye ray and the beam ($\theta_p$), the distances along and across the beam (v and u), and the distance to the camera (z).

These parameters influence the observed radiance through four physical processes, each associated with a function below:
1) color change due to attenuation along the beam, $f_b(v)$,
2) color change due to attenuation towards the eye, $f_e(z)$,
3) shading depends on the viewing angle, $f_f(\theta_p)$, and
4) shading is influenced by the photon beam's thickness, $f_t(u)$.

These high-level parameters, four physical processes, and media parameters σ, fully describe physically accurate shading as well as arbitrary non-physical shading behavior. For non-physical controllability, artists are allowed to specify their own instantiations of the four functions with a programmable shading language.

Our art-directable radiance estimate replaces Equation 3 with Equation 8.

$$L_m(x, u, v, z, \theta_p) = \sum_p f_t(u) f_b(v) f_e(z) f_f(\theta_p) \quad \text{(Eqn. 8)}$$

While this generalized model can be used for art-directable shading, it can also replicate physically accurate shading as shown by Equations 9A-9D.

$$f_t = \Phi_p k_r(u) \quad \text{(Eqn. 9A)}$$

$$f_f = \sigma_s \frac{p(\theta_p)}{\sin\theta_p} \quad \text{(Eqn. 9B)}$$

$$f_e = e^{-\sigma_t z} \quad \text{(Eqn. 9C)}$$

$$f_b = e^{-\sigma_t v} \quad \text{(Eqn. 9D)}$$

This reproducibility satisfies the second requirement in the above-listed core principles: generating physically-accurate to completely art-directable results. Note that this requirement is only partially satisfied here, for shading. The remainder of this requirement is satisfied as explained herein, using physically accurate beam generation and propagation.

FIG. 5 illustrates example non-physical shading of a Bumpy Sphere scene, using simple procedural modifications of the four physical processes. Entries in FIG. 5 that are marked with a dash use the physically-based definition of the associated physical process. Example shader code for reproducing the left-most image is included in Appendix A. Some embodiments implement our system using shade trees and a template Renderman™ shader, allowing artists to leverage familiar techniques, such as texture mapping and color spline manipulation. These can be used to, for example, specify the beam intensity fall-off rate ($f_t$) or the view-dependent scattering profile ($f_f$). Replacing the physically-accurate processes with procedural expressions can yield interesting shading effects. FIG. 5 combines physically-based parameter setting and non-physical shading in a scene with physically-accurate beam data.

Entries in FIG. 5 marked with a dash denote functions which match the physically accurate model. Regarding the mathematical and programmatic notation: "noise" and "tex" are noise and texture look-up functions, respectively and "beamID" is a unique integer assigned by our system to each beam. When "tex" is used, the associated texture map is included (all 1D textures in these examples).

The shader code in Appendix A can be used to generate physically-based beam shading. Coupled with the beam data provided in the supplemental file, this shader can be used to generate the scattering-only results from the first image of FIG. 5. In order to match our results, a glass shader must be applied to the bumpy sphere geometry, in conjunction with our shader and the provided beam data.

Figure 6:
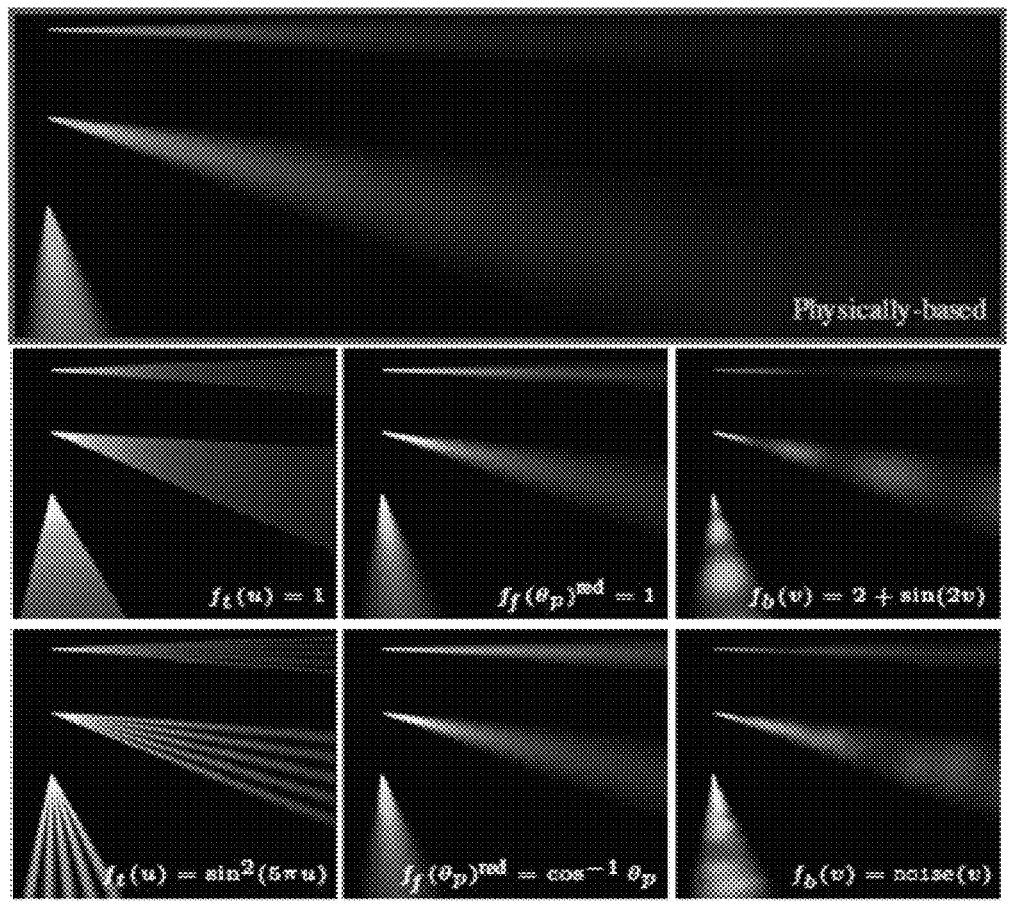
FIG. 6 illustrates photon beams lit in accordance with some embodiments.

FIG. 6 isolates simple changes to the individual physical processes, in a simple scene, to illustrate the impact that each process can have on the final shade. Beams are lit with the physically-based definitions of the four physical processes (top), and the effect on the final shade due to simple, isolated procedural modifications to three of the four physical processes (middle and bottom rows). Note that with simple modifications, a large breadth of artistic manipulations can be explored, even with photon beams generated using physically-based emission.

For physically-based lighting, photon beams can easily handle heterogeneous media as well. To accomplish this, the attenuation along each beam $f_b$ could be computed using a 1D texture (see e.g., FIGS. 5 and 6) that stores the accumulated optical depth. The attenuation towards the eye $f_e$ would also need to compute the transmittance, which could be accomplished using a deep shadow map. Automatic setting of physical scattering parameters in heterogeneous media may be within the scope of this disclosure.

As seen in FIGS. 5 and 6, our artistic abstraction provides even more flexibility to incorporate variation along the length of the beams and towards the camera. Such spatial variations can be injected using procedural functions such as Perlin noise or values stored in voxel data. To obtain physically-plausible results, however, it may be desirable to consider two aspects of physical lighting: 1) evaluating the attenuation functions based on world-space locations and distances (and not just parametric distances) gives the sense that these details are due to heterogeneous density in the scene and not attached to the beams, and 2) the attenuation functions should be monotonically decreasing along the beams and monotonically increasing towards the camera.

Procedural Photon Beam Generation

Lighting artists are familiar with tools used for generating such physically-based solutions and some embodiments have implemented a shadow-mapping-based approach to quickly generate single-scattered beams in a scene. While these methods of beam generation are useful for physically-accurate results, in some scenes a stylized volumetric effect is necessary. In these cases art-directable beam generation becomes important.

Figure 7:
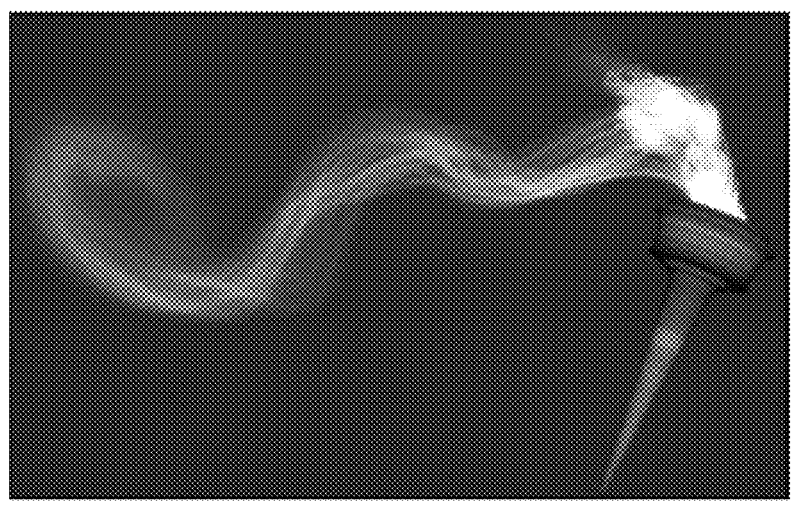
FIG. 7 illustrates an embodiment including two particle systems in order to model photon beams for both the smoke and the fire.

In one example embodiment, FIG. 7 was generated using the 2D illustrations in FIG. 3 as motivation. In this case, an artist created two turbulent particle simulations and associated a time-dependent path to each particle in the simulation. Particles were chained together to form the beam data used to render the smoke and fire. This entire process was completed by a single artist working with our system.

As discussed herein, the beams in a scene are a geometric lighting primitive that explicitly define the distribution of scattered light in a volume, or more simply, the volume's lit shape. This intuitive interpretation provides a key insight when designing a tool for art-directable beam generation. Traditional volume rendering includes the problem of defining a field of volumetric shading parameters, but now an artist can instead think of sculpting a volume as if it were a geometric entity; this is a natural 3D extension of the process of hand sketching 2D volumetric effect (see FIG. 3).

These observations justify and motivate our combination of traditional CG geometric design tools with art-directable volumetric beams. Procedural geometric modeling is used to deposit and evolve beams over time. One advantage of this approach is that existing tools handle explicit geometry much better than volume modeling. Another advantage is that it allows artists to focus on directly creating volumetric appearance instead of the potentially expensive process of indirectly inducing a desired appearance through physical simulation and volumetric shaders.

Figure 8:
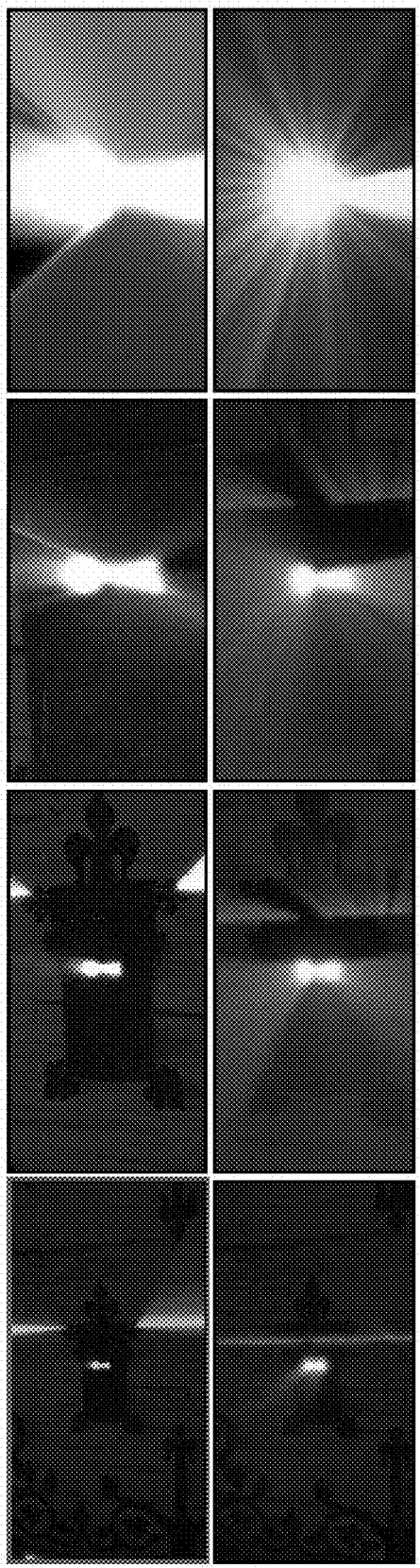
FIG. 8 illustrates and example door jamb and a keyhole that emit volumetric light.

FIG. 8 illustrates this approach with light "pouring out of" a door crack and keyhole. This is a common lighting scenario in movie production, but unfortunately a notoriously difficult sampling problem for physical simulation. Instead of manually placing lights (in the occluded room) and relying on expensive physical simulation to generate beams, artists are allowed to sculpt this distribution directly. The artist models the beams of light coming through the door with a procedural particle system, distributing points along the crack with the necessary beam attributes (direction, length, power and width). Jittering the beam start points (procedurally) adds to the dramatic effect and the artist can easily add procedural, time-dependent perturbations to animate the beams.

Procedurally-generated beams can form curved, warped frustra, as opposed to the perfectly conical frustra generated with physically accurate light transport. This is especially common when generating beams from procedural or fluid-based simulation. As discussed earlier on, a single photon beam can be interpreted as a spatially-varying volume of light. Thus, each curved photon beam induces volumetric a bendy light, albeit with a more flexible, art-directable spatial and angular radiance distribution.

Results

Our system was used in the production of two rendered scenes (see FIGS. 1 and 8).

In FIG. 1, curvy beams slowly fill a room, creating intricate, non-physical lighting both volumetrically and indirectly on surfaces. As an example, an artist might start with spiral and flower shapes on paper, implement them as curves in the curve handling software, such as the Houdini™ software, and use them as both paths and target shapes for beams.

Figure 9:
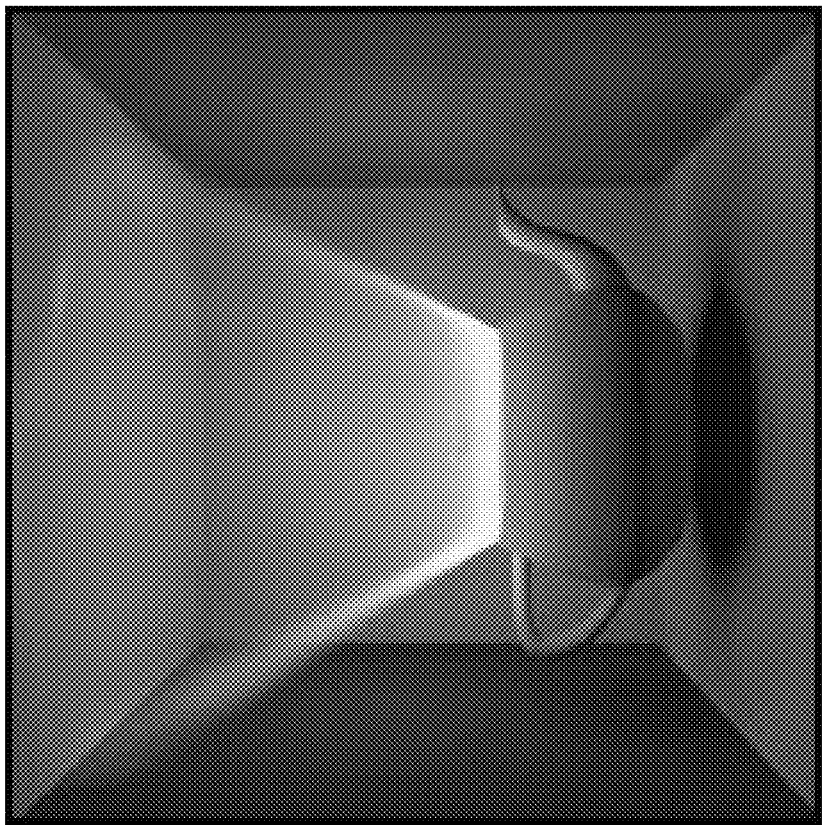
FIG. 9 illustrates an example use of procedural beams to light surfaces.
Figure 9:
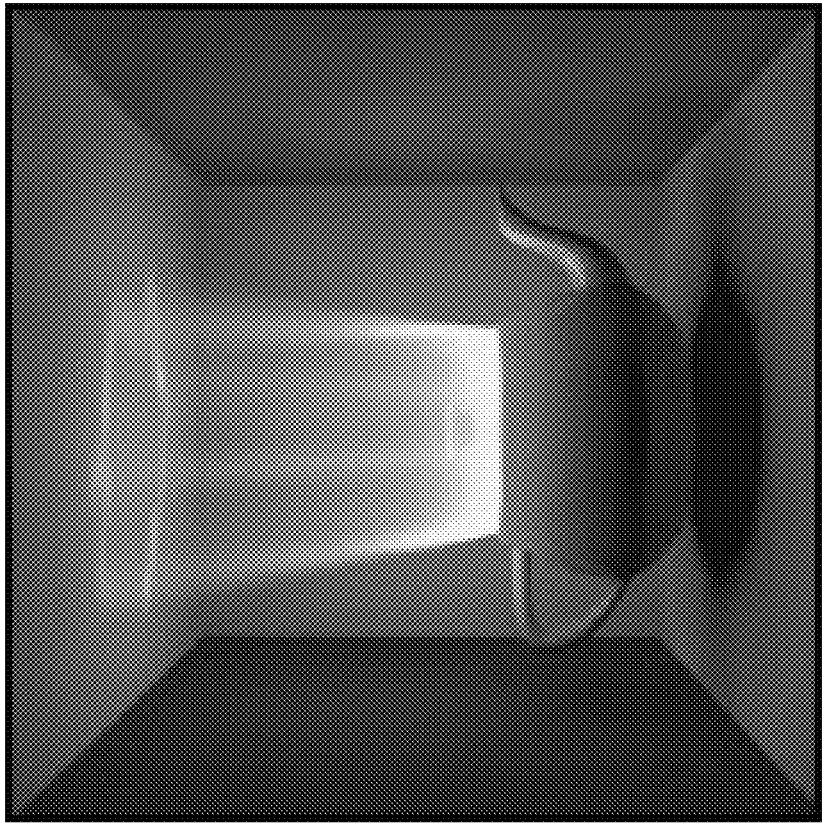

Although the focus is on volumetric effects, beams can naturally be sampled as light sources for surface shading. In FIG. 1, beams cast light on objects in the scene, as well as being reflected in the environment. Reflections were computed by ray-tracing photon beams as geometry. FIG. 9 shows a simpler scene with procedurally-generated beams which induce reflections and indirect diffuse lighting on other surfaces.

To compute indirect diffuse transfer from beams onto surfaces, point-based global illumination (PBGI) is extended to handle photon beams. First, beam geometry is point-sampled and the results are stored in a regular grid. At shading time, the grid is down-sampled and the reduced set of samples are treated as point lights (with inverse squared fall-off) and used to shade all surface points. Some embodiments optionally trace a shadow ray to each virtual source. Alternatively, shadows could be computed separately (with rasterization or ray tracing) at a lower spatial resolution.

FIG. 8 illustrates and example door jamb and a keyhole that emit volumetric light. The sequence in the top row was created using manually placed, static emissive curve geometry. In the bottom row, photon beams were created by distributing particles at the door jam and keyhole, animating these beam origins, and shading with our model.

When designing the original keyhole sequence, our artist commented on the labor-intensive process of modeling light streaks using tapered polygons which were carefully placed around the door cracks, as well as manually animated/deformed to match camera movement in a manner that achieved the desired fanned-out look. Several frustrations with this workflow were explicitly brought to our attention: difficulties designing the flaring effects of camera-facing lighting, the incorrect accumulation of these lighting geometries, and the limited patch-level control of noise which restricted the artist to a limited type of shader-level appearance manipulation.

In contrast, the same artist commented on several improvements our system provided for this scene. Generating light primitives was much simpler and faster, as beam starting locations were simply painted along the door cracks and any other emissive regions.

Lighting was accumulated in a much more natural and predictable manner; the density of painted beams directly mapped to expected intensity variation. More intuitive and fine-grained control over beams was exposed via the beam attributes (e.g., "beamID") used to steer fall-off, color, intensity, spread and directionality behavior. Beams behave correctly when intersecting the camera plane, eliminating the need for manual flaring composition.

Figure 10:
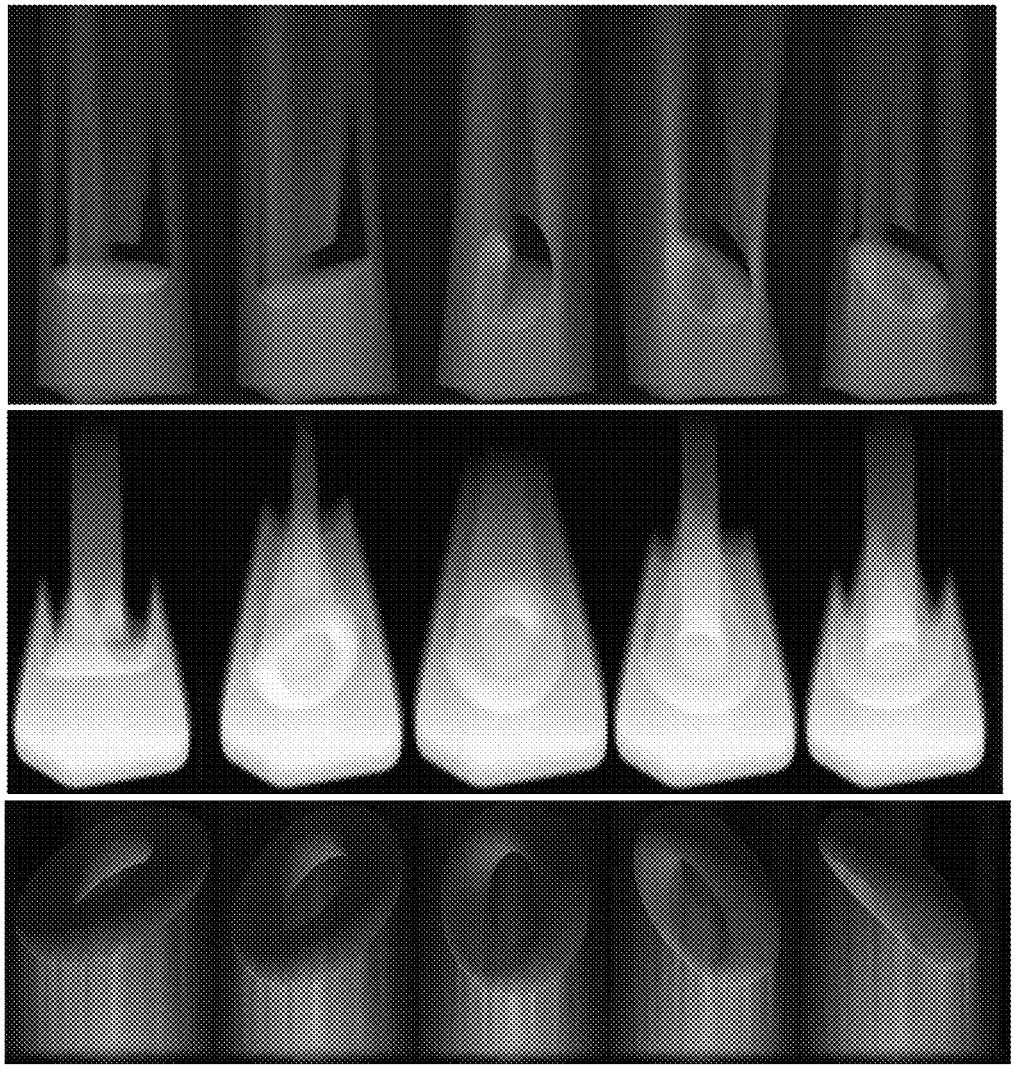
FIG. 10 illustrates three animation sequences of a torus, as executed by artists utilizing both traditional techniques and embodiments as disclosed herein.

Modeling and shading beams using the system provides an artist with much more creative freedom than previous ad-hoc techniques. FIG. 10 illustrates three animation sequences of a torus, immersed in a volumetric medium, rotating over a blue area light source. The top animation sequence was created by an artist familiar with our system. The bottom two rows of FIG. 10 are animation sequences generated by a different artist, unfamiliar with our system, first using traditional animation and rendering techniques (as shown in the middle row) and then using our system (as shown in the very bottom row).

The artist who was unfamiliar with our system was asked to replicate the animation of a rotating torus in volumetric fog lit by a single area source (as shown in the top row). The artist was first instructed to use any techniques and tools available. Afterwards, the artist was given a short introduction to our system and asked to once again replicate the result, this time with beams.

Without beams, the artist used a ray surface operation in the Houdini™ software to compute a deep shadow map (DSM) of the torus used to extrude a volume that approximated the lit media in the scene. Some additional processing of this explicit volume geometry was also necessary. With beams, the artist commented that the workflow was both more intuitive and more efficient, stating that beams were a "closer analogy" to the volumetric light. The artist elaborated on how the initial attempt (without beams) did not result in a very satisfying animation, required several "cheats," and was tedious to finalize. On the other hand, beams were simple to setup and manipulate, and resulted in a more satisfying design session.

Figure 11:
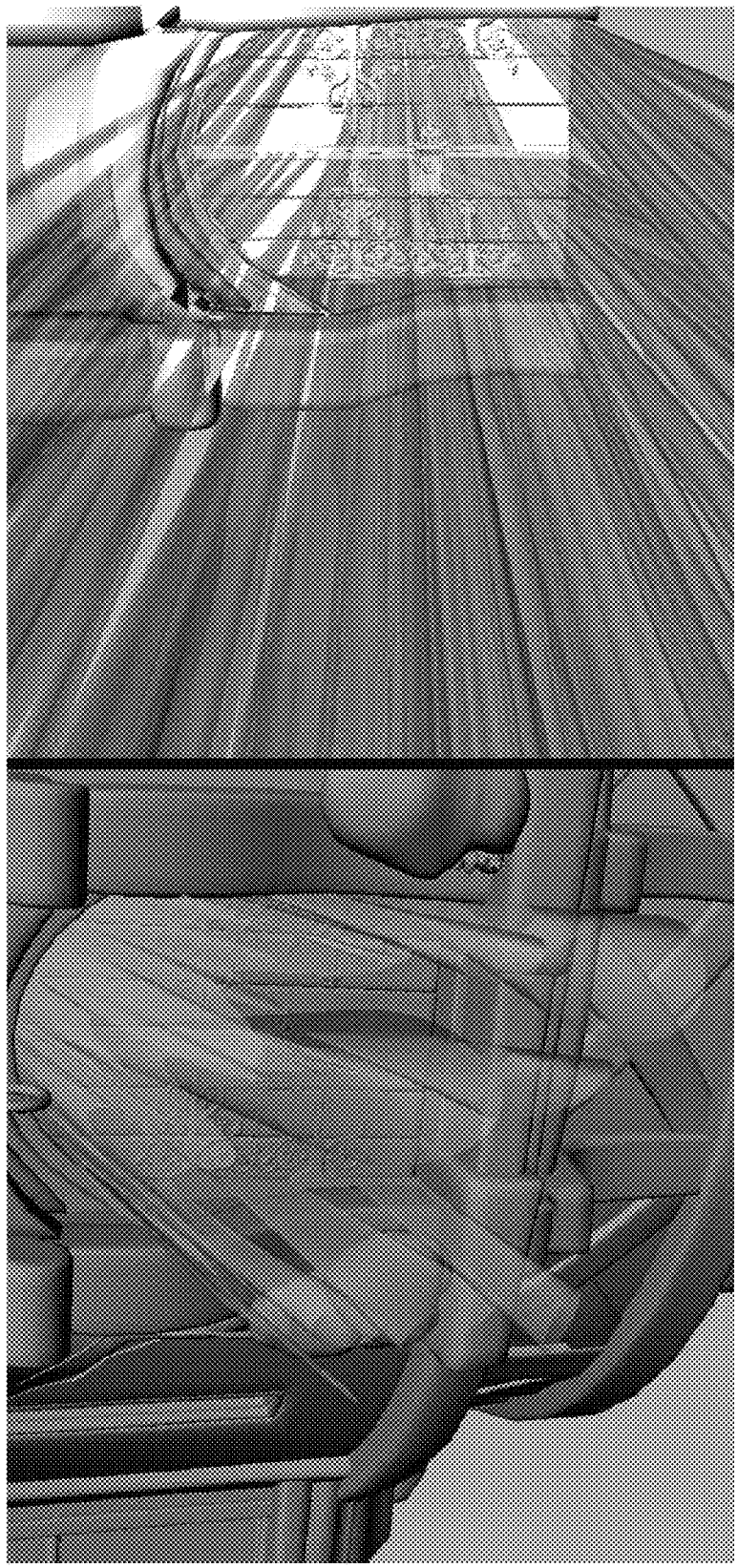
FIG. 11 compares the manual placement and animation of emissive surface geometry to the automatically-simulated beam geometry.

FIG. 11 visualizes (1) the emissive surface geometry used in the original keyhole sequence (on left), and (2) beams generated using a physical simulation in the final keyhole sequence (on right). The former technique (on left) required a tedious, manual placement and animation of emissive surfaces, whereas in the automatically-simulated beam geometry (on the right), artists simply "sprinkled" beam seed points along the door cracks and used standard particle simulation tools to evolve the beams over time.

Figure 12:
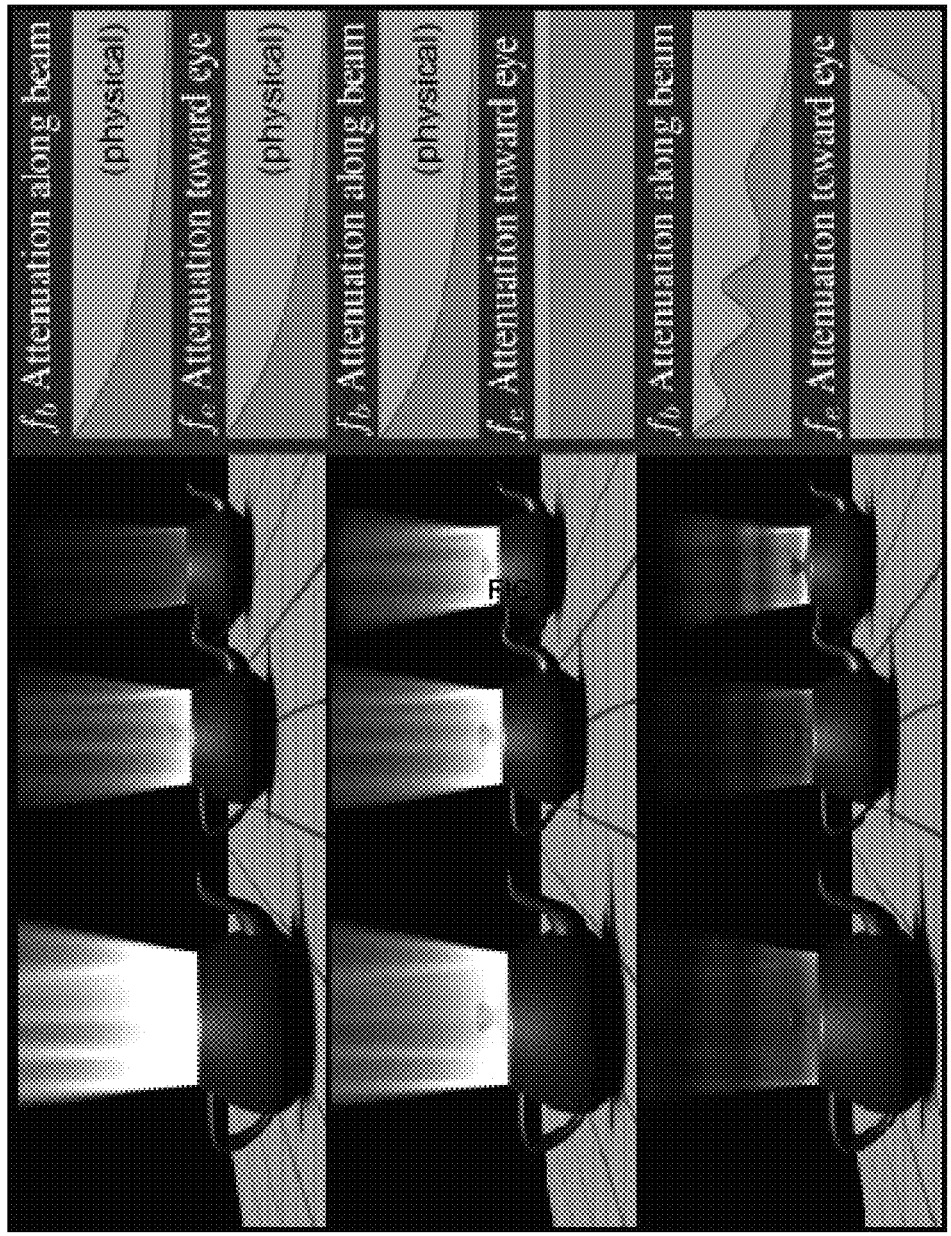
FIG. 12 illustrates example embodiments showing attenuation along beams and towards the eye.

In some embodiments, the most common deviations from physically-based shading involved $f_b$ and $f_e$. For example, in FIG. 1, beam attenuation was set according to custom splines and fall-off towards the eye was disabled, whereas the keyhole scene used physical fall-off along beams but non-physical fall-off towards the eye. FIG. 12 illustrates the influence of similar changes to $f_b$ and $f_e$. However, artists made it clear that the settings of the shading model are driven by an artistic process that is sensitive to the requirements of a particular sequence.

In general, our system can be implemented on top of almost any existing rendering backend. Any system capable of programmable shading of beam geometry is suitable, whether it be using RiCurves in PRMan, ray-tracing of beam geometry, or rasterization with programmable pixel shaders. Our final results are generated using PRMan's REYES-style renderer, with the exception of a customized ray-tracer used for shadow-ray computation in our experimental PBGI approach. Furthermore, we developed an expression-editing front-end to our shader (see supplemental material for source code) which allows programmable control.

As one of skill in the art would be aware after reading this disclosure, photon beams are well-suited to many types of volumetric phenomena. In particular, wispy effects, which were traditionally difficult to model with either point primitives or density grids, can be easily authored with beams. We have now presented a system for generating art-directable volumetric effects. Aspects of the physically-accurate photon beams approach relate closely to the methods artists normally use to reason about, and hand draw volumetric effects. By generalizing this approach and tying it to a geometric interpretation for volumes, and the lighting within them, an intuitive programmable model for designing volumetric effects is provided.

APPENDIX A

```
/*BEAM SHADER SOFTWARE
*Copyright 2011 Disney Enterprises, Inc. All rights reserved.
*/
class beamshader
(
   color sigma_s=0.1; //scattering coefficient
   color sigma_a=0.1; //absorption coefficient
   varying color power=0; //beam power
   varying float width=-1; //beam width (redundant for RICurves)
   uniform float beamLength=0; //beam length
   uniform float beamDir[ ]=; //beam direction
   float boost=1; //constant linear scaling of intensity
)
{
   constant float phase=1.0/(4*PI);
   constant float EPSILON=1e-6;
   float kernelBiweight(float y) {
   float x=clamp(y,0.0,1.0);
   return (15.0/16.0)*(1-x*x)*(1-x*x);
   }
   //Pre-integrated biweight kernel function
   float kernelBiweight(float u; float du) {
   float s=clamp(2*u-1-du,-1.0,1.0);
   float t=clamp(2*u-1+du,-1.0,1.0);
   float s3=s*s*s, t3=t*t*t, s5=s3*s*s, t5=t3*t*t;
   return (15.0/16.0)*(t5/5.0-2.0*t3/3.0+t-s5/5.0+2.0*s3/3.0-s)/(t-s);
   }
   color transmittance(float dist) {
   color sigma_t=sigma_s+sigma_a;
   return color(exp(-comp(sigma_t,0)*dist),
      exp(-comp(sigma_t,1)*dist),   exp(-comp(sigma_t,2)*dist));
   }
   public void surface(output color Ci,Oi) {
   float eyeDist=length(I);
   float sampleDist=beamLength*v;
   vector Inorm=I/eyeDist;
   vector beamDirnorm=
      normalize(vector "world" (beamDir[0], beamDir[1], beamDir[2]));
   //Beam blur across width and beam ends
   float blur=kernelBiweight(u, du);
   float distancefromend=beamLength-sampleDist;
   if(distancefromend<width)
      blur*=kernelBiweight(1.0-distancefromend/width);
   if(sampleDist<width)
      blur*=kernelBiweight(1.0-sampleDist/width);
   //Inverse sine computation
   float cos_e_b=beamDirnorm.Inorm;
   float invSin=sqrt(1.0-cos_e_b*cos_e_b);
   invSin=1.0/max(EPSILON, invSin);
   Ci=transmittance(eyeDist)*transmittance(sampleDist)*invSin;
   Ci*=boost*power*phase*sigma_s*2.0*blur/width;
   Ci=clamp(Ci, color(0,0,0), color(1.0,1.0,1.0));
   }
}
```

What is claimed is:

1. A computer-implemented method for creating artistic effects for volumetric illumination in a scene comprising participating media, wherein the method is performed by a computer system programmed to perform the method, comprising:

receiving data representing the scene comprising the participating media;

obtaining a plurality of photon beams for the scene;

receiving a user specification of a target appearance of the scene, wherein the user specification describes illumination effects for the scene;

receiving from a user an instantiation of a function to be used in calculating a radiance due to the participating media;

generating, using one or more processors associated with the computer system, a plurality of modified photon beams representing volumetric illumination in the scene, wherein the generating incorporates one or more modifications of at least one of the plurality of photon beams based on the user specification;

calculating the radiance due to the participating media using the plurality of modified photon beams and the instantiation of the function received from the user;

computing, using one or more processors associated with the computer system, a shading of the scene using the calculated radiance; and generating a rendering, using the one or more processors associated with the computer system, of the scene.

2. The method of claim 1, wherein the user specification includes specification of attributes associated with generation of at least one of the plurality of modified photon beams, the attributes comprising at least one of:

one or more powers;
one or more shapes;
one or more physical dimensions; and
one or more directions.

3. The method of claim 1, wherein the user specification includes specification of a modification for a given photon beam or set of photon beams, modifying a path, a direction, and/or a set of colors for portions of the given photon beam or set of photon beams.

4. The method of claim 1, wherein the specified target appearance of the scene includes specification of time-variation of an attribute associated with at least one of the plurality of photon beams.

5. The method of claim 1, wherein obtaining the plurality of photon beams comprises generating the plurality of photon beams from programmatic inputs.

6. The method of claim 1, wherein obtaining the plurality of photon beams comprises generating the plurality of photon beams from programmatic inputs generated from an output of a shader.

7. The method of claim 1, wherein obtaining the plurality of photon beams comprises generating the plurality of photon beams from user inputs.

8. The method of claim 1, wherein receiving the user specification comprises receiving programmatically derived inputs.

9. The method of claim 1, wherein receiving the user specification comprises receiving manually entered user inputs.

10. The method of claim 1, wherein the user specification includes illumination effects that are non-physically based.

11. The method of claim 1, wherein the user specification includes illumination effects that are consistent with a set of optical and/or physics rules and specifies illumination values for at least two distinct locations of a photon beam.

12. The method of claim 1, further comprising incorporating the user specification into a simulation associated with the scene.

13. The method of claim 1, wherein the illumination effects are at least in part non-physically-based.

14. The method of claim 1, further comprising:
determining whether the user specification complies with optical or physical law constraints;
in response to determining that the user specification complies, running a simulation using the user specification; and
in response to determining that the user specification does not comply, notifying the user of the lack of compliance.

15. The method of claim 1, wherein the instantiation of the function received from the user describe at least one of:
color change due to attenuation along at least one of the photon beams;
color change due to attenuation towards a camera;
shading based on a viewing angle; and
shading based on a width of at least one photon beam.

16. A system for creating artistic effects for volumetric illumination in a scene comprising participating media, the system comprising:
one or more processors;
memory communicatively linked with the one or more processors and comprising code that when executed causes the one or more processors to perform a method comprising:
receiving data representing the scene comprising the participating media;
receiving a user specification of a target appearance of the scene, wherein the user specification includes a description of illumination effects for the scene;
obtaining a plurality of photon beams for the scene representing volumetric illumination in the scene;
receiving a user specification of a target appearance of the scene, wherein the user specification comprises one or more modifications of at least one of the plurality of photon beam;
receiving from a user an instantiation of a function to be used in calculating a radiance due to the participating media;
generating a plurality of modified photon beams representing volumetric illumination in the scene, wherein the generating incorporates the one or more modifications of at least one of the plurality of photon beams of the user specification;
calculating the radiance due to the participating media using the plurality of modified photon beams and the instantiation of the function received from the user;
computing a shading of the scene using the calculated radiance; and
generating a rendering, using the one or more processors of the system, of the scene.

17. The system of claim 16, wherein receiving the user specification comprises receiving manually entered user inputs.

18. The system of claim 16, wherein the user specification includes specification of indirect illumination of the participating media in the scene attributable to at least one of the plurality of photon beams.

19. The system of claim 16, wherein the instantiation of the function received from the user describe at least one of:
color change due to attenuation along at least one of the photon beams;
color change due to attenuation towards a camera;
shading based on a viewing angle; and
shading based on width of at least one photon beam.

20. The system of claim 16, wherein generating at least one of the modified photon beams comprises modifying a specified attribute of an associated photon beam by extrapolating values between a specified target initial value for the specified attribute at a first location along the associated photon beam and a specified target final value for the specified attribute at a second location along the associated photon beam.

21. The system of claim 20, wherein the user specification includes specification of time-variation of the specified attribute associated with at least one of the plurality of photon beams.

22. The system of claim 20, wherein the specified attributes associated with shading of at least one of the plurality of photon beams are modified to result in non-physically-based shading of the at least one of the plurality of photon beams.

23. The system of claim 16, further comprising incorporating the user specification into a simulation associated with the scene.

24. The system of claim 16, wherein the user specification includes specification of attributes associated with generation of at least one of the plurality of modified photon beams, the attributes comprising at least one of:
one or more powers;
one or more shapes;
one or more physical dimensions; and
one or more directions.

25. The system of claim 16, wherein receiving the user specification comprises receiving programmatically derived inputs.

* * * * *